Oct. 14, 1952         D. L. CALKINS         2,613,585
ROTARY SUBSOILER
Filed Nov. 12, 1946         2 SHEETS—SHEET 1
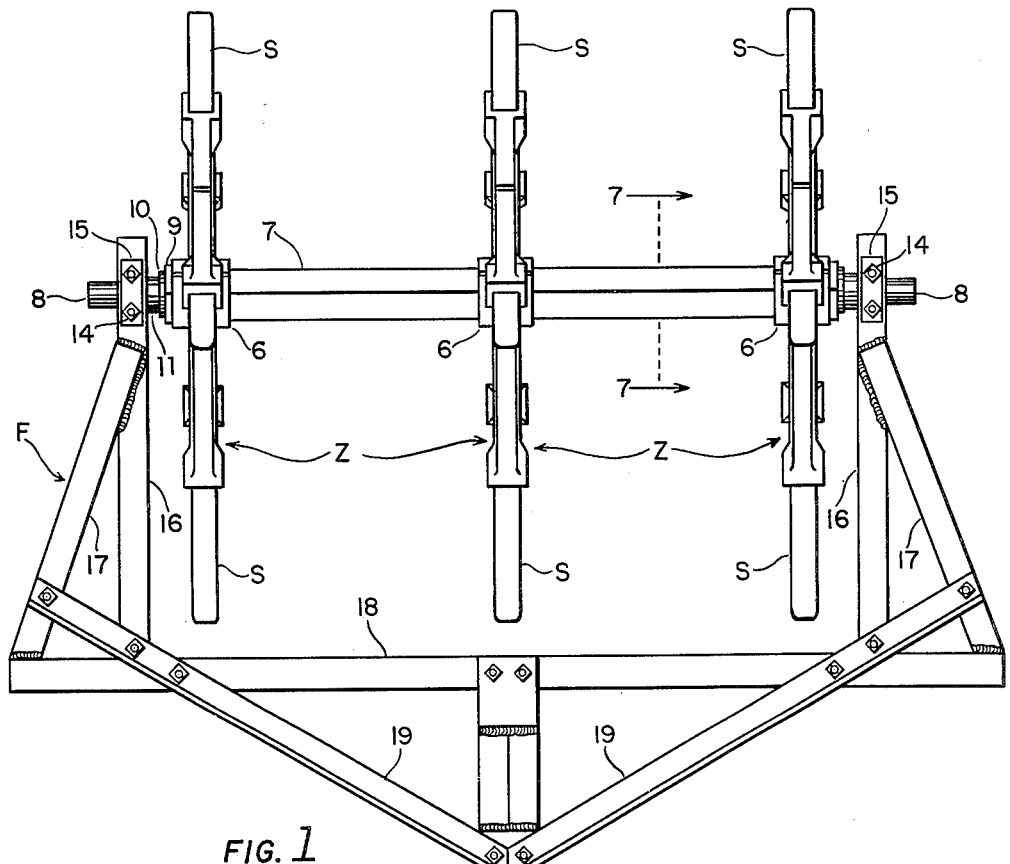
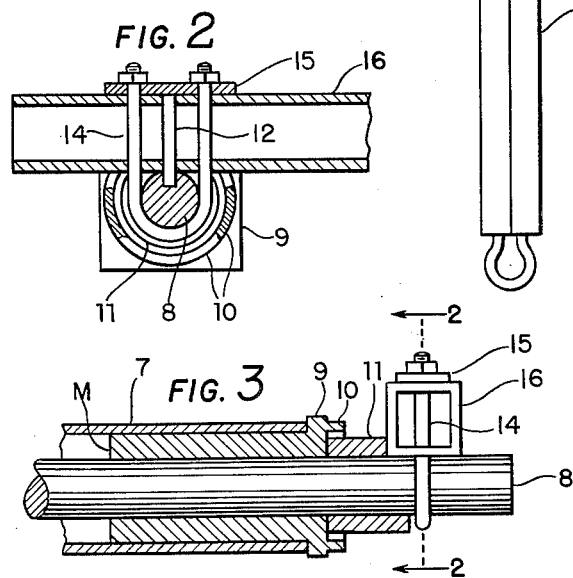
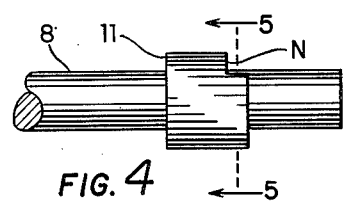
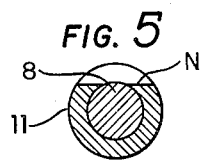
INVENTOR
DWIGHT L. CALKINS
BY O.W. Lee
ATTORNEY Oct. 14, 1952      D. L. CALKINS      2,613,585
ROTARY SUBSOILER Filed Nov. 12, 1946      2 SHEETS—SHEET 2

INVENTOR
DWIGHT L. CALKINS
BY O. W. Lee
ATTORNEY

Patented Oct. 14, 1952

2,613,585

UNITED STATES PATENT OFFICE 2,613,585

ROTARY SUBSOILER

Dwight L. Calkins, Spokane, Wash., assignor to Calkins Manufacturing Company, Spokane, Wash.

Application November 12, 1946, Serial No. 709,198

5 Claims. (Cl. 97—212)

1

The present invention relates to certain new and useful improvements in a rotary subsoiler of the rotary chisel type for puncturing the soil below the usual depth of tillage and prying up the compacted soil so as to form fractures through which rainfall can readily enter the underlying soil, and thus increase the moisture storing capacity of the soil, and thereby prevent the erosion which would otherwise occur either from surface run-off on hard untilled soil, or else from excessive moisture in the tilth of recently tilled soil.

It is well known that nation wide investigations have been made in an intensive effort of soil conservation, and various methods have been proposed to avoid the damage caused by rainfall and also to conserve the moisture which falls between one growing season and the next. It is well recognized that in most agricultural areas, the surface soil can not absorb rainfall fast enough to prevent run-off, and it is also well known that excessive moisture in the surface soil renders it exceedingly soft and therefore susceptible to excessive erosion. It is quite generally conceded that deeper penetration of moisture is needed to prevent erosion and for increased crop production.

It is well known that most methods of tillage form a compacted strata at the depth of tillage, and this so-called plowpan acts as a barrier which greatly resists deeper penetration of moisture. Greatly increased moisture capacity can be obtained by fracturing this plowpan at spaced intervals. Attempts have been made to accomplish this purpose by rotary chisels, but difficulty has been experienced in obtaining adequate penetration in hard soils, where the need is greatest. It has also been determined that mere puncture without fracture, is not sufficient to adequately serve the purpose. The problem appears simple, but in actual practice there are complexities and difficulties which are not readily solved.

In my experiments and experiences, I have determined that it is impossible to obtain adequate penetration in hard soil, with chisels that are radially disposed, and I have also determined that it is impossible to obtain adequate prying action and fracture by any form of pivoted chisel; furthermore, pivoted chisels readily become clogged with dirt and fail to pivot, and they are also likely to engage large tares and therefore fail to pivot and consequently cause difficulty in operation. I have also found that there is a definite disadvantage to mounting the chisels on a wheel, because that precludes having two chisels completely imbedded in the soil at the same time and spaced apart more than their radial distance, as is quite necessary for proper prying action and for proper spacing of the penetrations made in the soil. I have also found that in order to obtain efficient penetration, it is necessary for the center of gravity to be forward of the point of support at the time each succeeding chisel enters the soil, and this is impossible with chisels on a wheel, and also impossible with any staggered relation of the chisels on different heads carried by the same frame. I have also determined that the chisels must be spaced apart a sufficient amount to assure that the fractures made by one chisel will not intersect any fracture made by an adjacent chisel.

With these discoveries, among others, I have devised the present invention, so as to overcome the difficulties of the prior art, and thereby produce an implement which will adequately serve the intended purpose. According to my invention, the chisels are mounted in a polygonal head, with each chisel disposed at slightly more than ninety degrees from that side of the polygon which extends rearwardly therefrom when flat upon the soil, and a number of these heads are secured to a rotatably mounted axle, with the chisels of one head aligned with those of the other heads, so as to operate in unison.

The accompanying drawings show the preferred embodiment of the invention.

Fig. 1 shows a plan view of the invention.

Fig. 2 shows a section taken on the line 2—2 of Fig. 3.

Fig. 3 shows a longitudinal section through the axle and dead shaft.

Fig. 4 shows a spacer block used on the end of the dead shaft.

Fig. 5 shows a section taken on the line 5—5 of Fig. 4.

Figure 6:
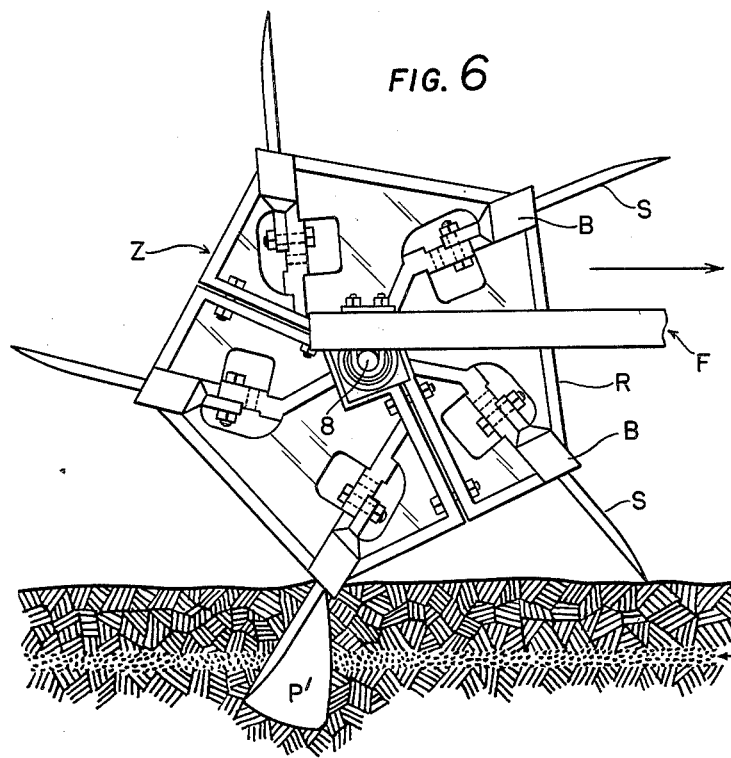
Fig. 6 shows an end view of Fig. 1, part of the frame being broken away, and one of the chisels being shown at the start of penetration into the soil.

As will be seen from Fig. 1, the invention provides a greatly simplified structure. As here shown, the main frame consists merely of a front rail 18 connected in T-fashion to two side rails 16—16 and braced by suitable struts 17—17, and a draft tongue T is bolted to the front rail and suitably braced by diagonal bars 19—19 which are bolted to the main frame.

A dead shaft 8 is securely clamped to the side rails 16 and 16 by U-bolts such as 14—14. As shown in Fig. 3 these side rails 16 are square, and are usually made by welding two pieces of angle iron together. As best seen in Fig. 2 each U-bolt 14 is saddled over the shaft 8 and then passed through the side rail 16 and through a tie plate 15 which is employed to retain the dowel pin 12 which passes through the side rail 16 and seats in a socket in the shaft 8 to hold the latter against rotation and against endwise movement relative to the frame. As best seen in Fig. 4 and Fig. 5 the dead shaft 8 is provided with a spacer sleeve 11 which as shown at N is notched out to the depth of the shaft so as to fit under the side rail 16 as shown in Fig. 3 and thus preclude rotation without resorting to the use of a setscrew or other means commonly used for such purpose.

The axle 7 is square and is usually formed by welding two angle irons together. As best seen in Fig. 3, each end of this axle is provided with a bearing M having a flange 9 which seats against the end of the axle and is held against end movement by the aforesaid spacer sleeve 11, a grease retaining rim 10 being provided to serve as a dust seal. In this manner, it is possible to provide a bearing of any required length, and it would of course be impossible for a bearing the size of M to be mounted on the side rail 16.

From this description it will be seen that the shaft 8 serves as a tie rod strongly holding the frame against the end thrust of the axle 7, otherwise it would be impossible to employ a skeleton frame of the type disclosed. It will also be seen that this provides a U-shaped frame, entirely open at the rear, so as to provide free escape for stubble, tares, etc.

Figure 7:
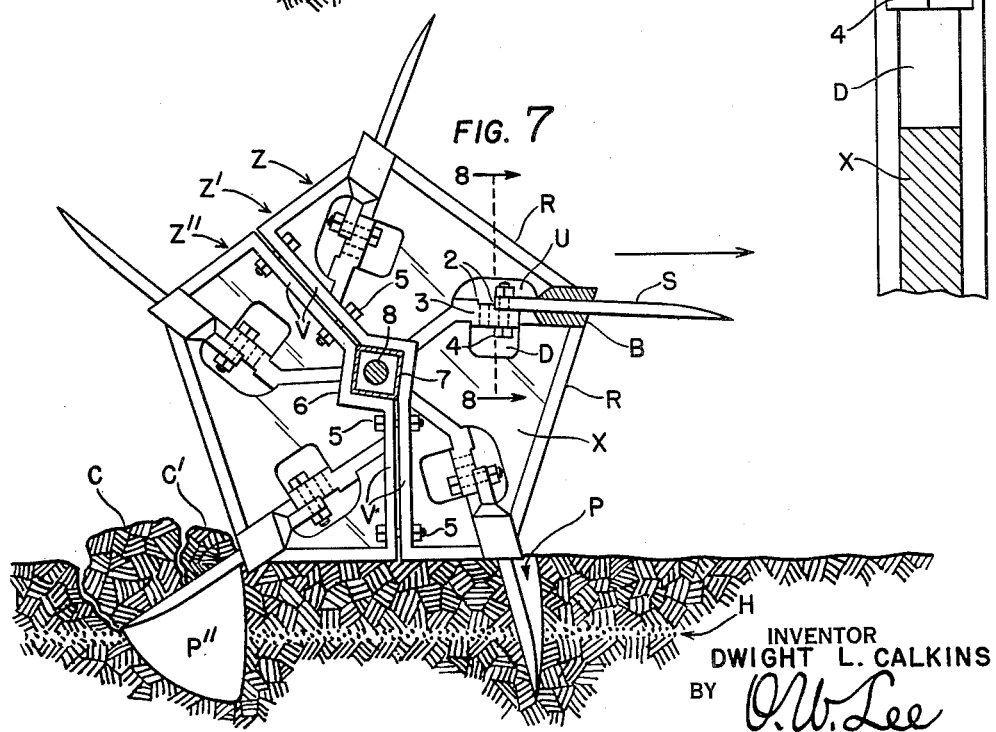
Fig. 7 shows a sectional view taken on the line 7—7 of Fig. 1 and showing two of the chisels completely embedded in the soil at the same time.

The chisels S are mounted in series in polygonal heads such as Z which are secured to the axle 7 with the chisels of one head aligned with those of the other heads, three such heads being shown in Fig. 1. As shown in Fig. 6 and Fig. 7 each chisel S is disposed oblique to the radius at that corner from which the chisel protrudes, so that the chisel forms an angle of slightly more than ninety degrees with its associated side of the polygon which extends rearwardly therefrom when flat upon the soil. That is to say, ten or fifteen degrees more than a right angle, or about 100 degrees, a variation of five degrees more or less, being within the range of satisfactory operation. This described angular relation of each chisel greatly increases the penetration and avoids the forward creepage which is so objectionable in radially disposed chisels because it somewhat retracts the adjacent chisel already imbedded in the soil. Moreover, with the described angular relation, the prying action of one chisel will complete its fracture of the soil by the time that any succeeding chisel penetrates full length into the soil and before any succeeding chisel exerts any prying action on the soil; thus there is a more even distribution of the power requirements.

In Fig. 7 where the angular relation is shown as 105 degrees, it will be seen that during the penetration, the point of the chisel follows an almost vertical path and practically completes its penetration by the time the flat side of the polygon rests on the surface of the ground. It will also be seen that at this stage of the operation, the adjacent chisel has already fractured the soil and formed large clods such as C and C' which are here shown as lifted free of the pocket P''; but in actual practice, almost all of the dirt remains in the pocket because the chisels are only two and a half or three inches wide and therefore merely fracture the soil by their prying action and do not lift any appreciable amount of dirt. It should be noted that if the chisels were carried by a wheel, that in this position the tire of the wheel would hold both chisels partly out of the ground, and thus delay the penetration and practically defeat the prying action, and with the further inaptitude that as the wheel rolled forward to complete the penetration, the adjacent chisel would be retracted out of the soil instead of prying its way out in the manner of the present invention.

In Fig. 7 it will be seen that the center of gravity which is of course the axis of the shaft 8, is situated rearwardly of the recently penetrated chisel in the pocket P and that any further movement will bodily lift the center of gravity over this chisel until the center of gravity is forward of that corner of the head which is the point of support at the time the next succeeding chisel enters the soil, as is shown in Fig. 6, where it will be seen that the forward chisel is subjected to gravity penetration. Moreover, it will also be seen that this forward chisel is also subjected to the draft force in the direction of pull indicated by the arrow, and consequently, any resistance to penetration will be overcome by the draft force which will effectively urge the chisel into the soil. Furthermore, the adjacent chisel being embedded in the pocket P' precludes any lifting action and thereby enhances the penetrating effect.

It should be noted that the center of gravity is repeatedly lifted up over the point of support, in contradistinction to a wheel wherein the center of gravity is directly above the point of support at all times. That is to say, that the falling action of the polygonal head helps to drive the chisel into the ground. It should also be mentioned that with radially disposed chisels, the draft force would cause slippage and creepage and no worthwhile benefit could be gained therefrom.

The chisels S usually extend about twelve inches beyond the boxings B, so as to reach entirely through the hardpan indicated at H, and effectually fracture that compacted strata so that moisture can readily enter the underlying soil. It will be understood that the area P'' in Fig. 7 represents the path of the chiesl and is not intended to indicate a hole. The described prying action causes fractures extending one foot or more on each side before the chisel breaks through to form the clods such as C and C' which are of course much wider than the chisel itself, and in fact three or four times wider than the chisel which in reality breaks through between similar clods on opposite sides thereof, and furthermore, the fractures extend laterally a considerable distance beyond the clods. This extensive fracture action and large clods can not be obtained by mounting the chisels on a wheel nor by any staggered arrangement of the chisels on one head with relation to those on the other heads, because either of such arrangements preclude the complete penetration afforded by the flatside contact of the polygonal head as in the present invention.

Of course, this described fracturing of the soil is not intended for tillage purposes, but rather as a separate procedure, independent of whatever kind of tillage may be subsequently used before planting the crop. As for instance the present invention can be used in the stubble field after harvest so as to fracture the soil and enable any rainfall to promptly penetrate instead of running off. In such instances, the soil will usually have a hard crust on the surface, and will also be depleted of humus and therefore quite hard in general, and there will also be the hard compacted plowpan H caused by the previous tillage. This condition makes it exceedingly difficult for chisels to penetrate, and the present invention has been perfected so as to fully perform this difficult task. It will of course be understood that this is an entirely different problem than the rotary diggers which are used for tillage and cultivation and could not possibly accomplish the purposes of the present invention.

In the present invention, the chisels are about two feet apart and the polygon heads Z may be spaced along the axle any suitable distance, such as three or four feet apart, it being understood that the fractures caused by each chisel should be entirely segregated from those of the others so that rainfall will be confined to each respective set of fractures and can not run from one set of fractures to another, as that would be highly objectionable on hillsides, and that is the situation where most of the nation's wheat crop is grown.

The invention is not only intended to conserve the moisture which falls between seasons, but it can also be employed in recently tilled soils which are of such nature that the usual rainfall during the growing season can not readily penetrate to sufficient depth to prevent runoff and the erosion resulting therefrom. In such instances, the present invention can be used after the tillage and will operate through the tilth and will fracture only the plowpan, there being no solid soil thereabove to break through to the surface. Thus there is a tilth covering the multifractured plowpan.

The invention is also of inestimable value in instances where the soil conservation procedure necessitates leaving a cover crop standing two or three years as is often done in governmental soil conservation. In such instances, tillage is of course prohibited, and the present invention can be repeatedly used in the standing cover crop so as to accomplish maximum moisture storage.

The invention is also of advantage in raising perennial crops such as alfalfa, and can be operated in the growing crop so as to obtain maximum penetration of rainfall and thus increase the crop yield.

The polygonal heads may have four, five or six sides, with a chisel at each corner, but as shown in the drawings, the preferred embodiment is a pentagon head. These heads are subjected to severe stresses and must be strongly constructed so as to withstand the hard usage to which they are subjected. They may be satisfactorily built up structurally by welding channel iron together in a suitable manner, but I prefer to make them as heavy castings and thereby increase the weight of the machine and consequently increase the penetrating effect of the chisels.

As best seen in Fig. 7 each pentagon head Z is made in two sections Z' and Z'' which are clamped to the square axle 7 by bolts such as 5—5 which pass through radiating flanges such as V—V which extend from the hub 6 and out to the marginal flanges such as R—R. Each of these sections Z'—Z'' also includes a heavy web X which extends from the square hub, outwardly to the marginal flanges R. In this way, each polygonal head can be made to weight three hundred pounds or more. It will also be seen that the clamp action of the bolts 5—5, enable the heads to be readily moved along the square axle 7 so as to afford whatever spacing that may be required, and this structure eliminates all need for setscrews, keyways and other expedients which are commonly employed to mount heads on a round axle. With this heavy cast head or else with a fabricated head, it would be possible to suitably bolt the chisels to the marginal rim, and bend each chisel to the required angle; but I prefer to employ straight chisels and mount them at the proper angle in the manner illustrated.

As shown in Fig. 7, each corner of the pentagon is provided with a boxing such as B through which the chisel extends into an opening U formed above a crossweb 3 to which the chisel is bolted as indicated at 4. This cross web is provided with a shoulder such as 2 against which the end of the chisel abuts, so as to preclude any shear action. Two such shoulders are shown so as to set the chisel at two different lengths. It will be seen that the bolt 4 is merely for retaining the chisel in position and is not subjected to any stress of the chisel which has all of its bearing against the boxing B and the crossweb 3 instead of against the bolt. The opening D is provided for the convenience of shifting the bolt 4 and also to accommodate a wrench; and the boxing B is made of sufficient size to afford suitable clearance for the chisel, a tight fit being unnecessary because the soil soon packs in behind the chisel and holds it against movement in the boxing B.

Figure 8:
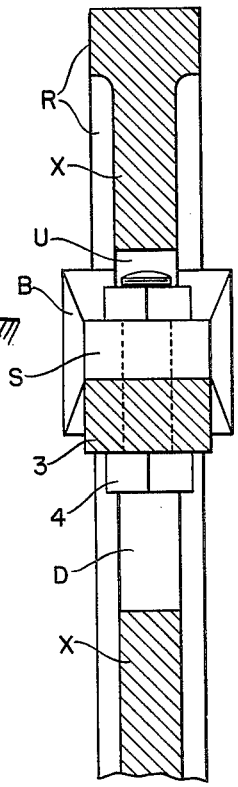
Fig. 8 is an enlarged sectional view taken along the line 8—8 of Fig. 7.

As shown in Fig. 8, these boxings B may be wider than the marginal flanges R so as to accommodate a chisel S slightly wider than the marginal flanges R, but of course these flanges can also be made of the same width as the boxings if desired.

The invention is primarily intended for the difficult task of penetrating and fracturing hard plowpan, but it can also be quickly and easily converted into a tillage implement for producing a coarse cloddy tilth in hard ground. For this purpose, the pentagonal heads are usually spaced about a foot apart and are assembled in alternate 180° relation upon the square axle, to thereby produce a uniformly staggered relation of the chisels on the alternate heads. This close spacing enables the implement to effectively break up the entire surface of the soil in a multiplicity of interconnected fractures. It the staggered heads are spaced apart one half as far as the distance between chisels on each individual head, then there will be a uniformly distributed fracturing of the entire surface of the soil, and the fractures formed by the chisels on one head will extend between those of the adjacent head and will interconnect with those formed by the chisels on the head on the opposite side of that adjacent head.

For this coarse tillage purpose, the chisels need not penetrate the hardpan, and therefore, shorter chisels may be employed, or some of the heads may have short chisels and other heads have chisels long enough to penetrate and fracture the plowpan.

The previously described oblique inclination of the chisels assures efficient penetration and enables the invention to be used for this described coarse tillage in the hard topsoil of stubble fields. For this purpose, chisels which are not long enough to penetrate the plowpan, will effectively break up the hard compacted topsoil into large clods and will leave the stubble and other vegetation on the surface, so as to prevent wind erosion and also to prevent snow from blowing off before it melts. In this manner the invention produces a coarse tillage, very much in the nature of subsurface tillage. This coarse tillage is not merely a series of holes or pockets such as produced by pivoted chisels, but due to the pry action of the oblique chisels of the present invention, the hard topsoil is profusely fractured and formed into large clods, and any fine tilth falls down between these clods so as to be protected from wind erosion.

Thus it will be seen that the square hubs on the square axle are of paramount importance for quickly and easily converting the subsoiler to a tillage implement and vice versa. In contradistinction to a round axle, which would require a different keyway for each position of the pentagonal head, the aforesaid square hubs on the pentagonal heads, enable them to be readily assembled on the square axle, with the chisels either aligned or else staggered, and without resorting to any keyways, thus saving the expense of machining such keyways, which would be economically impractical in an implement of this kind.

It should be noted that the pentagonal head is of smaller dimension than would be required for a hexagonal head having the same spacing of chisels thereon. Furthermore, the pentagonal head is the only feasible polygon which will afford the aforesaid staggered relation when oppositely oriented 180°. However, I may employ the aforesaid square hubs on hexagonal heads, so as to afford a staggered relation when they are assembled in alternate 90° relation on the square axle. In either instance, there is no need for the square hub to be parallel to one of the sides of the polygon, and it will be noted in Fig. 7, that the hub 6 is not parallel to any side of the pentagon, the disclosed arrangement being more advantageous for the illustrated clamp action of the two separable parts Z' and Z".

I claim as my invention:

1. A rotary subsoiler comprising a polygonal head having a central support for mounting a shaft by which the head is drawn over the ground and about which the head may rotate, said head having a series of chisels extending from the corners thereof, each of said chisels being disposed oblique to the radius at that corner and held at a fixed angle at least as far from the radial position as from the perpendicular to that side of the polygon which extends rearwardly therefrom when in its lowermost position, whereby the center of gravity is always forward of the point of support at the time any of said chisels enter the soil.

2. A rotary subsoiler comprising a polygonal head having a central support for mounting a shaft by which the head is drawn over the ground and about which the head may rotate, said head having a series of chisels extending from the corners thereof, each of said chisels being disposed oblique to the radius at that corner and held at a fixed angle of approximately one hundred degrees from that side of the polygon which extends rearwardly therefrom when in its lowermost position, whereby the center of gravity is always forward of the point of support at the time any of said chisels enter the soil, and whereby two chisels on the same head can be completely embedded in the soil at the same time, so that each chisel will exert a full depth prying action to fracture the soil and form large clods.

3. In a rotary subsoiler, a polygonal head having a hub for engagement with an axle, each corner of said polygonal head having a boxing formed integral therewith, marginal flanges connecting said boxings and forming the rim of said polygonal head, a main web extending from said hub outwardly to said rim, each of said boxings having a chisel extending therethrough and disposed oblique to the radius at that corner, crosswebs to which said chisels are bolted, said main web having openings on opposite sides of each of said crosswebs for accommodating said chisels and their bolts, and each crossweb having one or more shoulders to limit the end thrust of the chisel mounted thereon.

4. A rotary subsoiler comprising a frame having a front rail and paired side rails, a square tubular axle, flanged bearings inserted into the opposite ends of said axle with their flanges seating thereagainst, a dead shaft passed through said bearings and secured to said side rails to preclude spreading thereof, a pair of spacer sleeves mounted on said dead shaft and seating against the outer faces of said bearings, the outer ends of said spacer sleeves being notched out and engaged under said side rails to hold said spacer sleeves against rotation, polygonal heads secured to said square axle, each of said heads having a series of rigid chisels extending obliquely from the respective corners thereof, and a draft tongue connected to said front rail, the rear of said frame being entirely open for the free escape of refuse.

5. A rotary subsoiler comprising a polygonal head having a central support for mounting a shaft by which the head is drawn over the ground and about which the head may rotate, a rigid chisel rigidly secured to and protruding from the head at each corner thereof, each chisel being disposed oblique to a radial line from the center of said head through the corner from which the chisel protrudes, each chisel making an angle of about 100 degrees to 115 degrees to that side of the polygon which extends rearwardly therefrom when in its lowermost position so that the pull on the shaft to advance the head and weight of the head act together toward forcing the entire chisel into the soil before the center of gravity of the head passes over the chisel.

DWIGHT L. CALKINS.

REFERENCES CITED

The following references are of record in the file of this patent:

UNITED STATES PATENTS

| Number | Name | Date |
| --- | --- | --- |
| 634,825 | Mallon | Oct. 10, 1899 |
| 1,265,491 | Obitts | May 7, 1918 |
| 1,744,170 | Lajeunesse | Jan. 21, 1930 |
| 2,048,201 | Short | July 21, 1936 |
| 2,135,192 | Mitchell et al. | Nov. 1, 1938 |
| 2,229,290 | Gosser | Jan. 21, 1941 |
| 2,323,460 | Domrese et al. | July 6, 1943 |
| 2,325,997 | Kelly et al. | Aug. 3, 1943 |

FOREIGN PATENTS

| Number | Country | Date |
| --- | --- | --- |
| 606,443 | Germany | Dec. 3, 1934 |